(12) United States Patent
Brizio

(10) Patent No.: US 7,569,240 B2
(45) Date of Patent: Aug. 4, 2009

(54) BEVERAGE PRESERVATION AND DISTRIBUTION CAN, ALSO USABLE FOR THE EXTEMPORANEOUS PREPARATION OF BEVERAGES BY EXTRACTION AND/OR INFUSION

(76) Inventor: Adriana Brizio, Via Sempione, 46, Baveno (IT) 28831

( * ) Notice: Subject to any disclaimer, the term of this patent is extended or adjusted under 35 U.S.C. 154(b) by 779 days.

(21) Appl. No.: 10/546,535

(22) PCT Filed: Feb. 11, 2004

(86) PCT No.: PCT/EP2004/001240
§ 371 (c)(1), (2), (4) Date: Aug. 22, 2005

(87) PCT Pub. No.: WO2004/073468
PCT Pub. Date: Sep. 2, 2004

(65) Prior Publication Data
US 2006/0165851 A1  Jul. 27, 2006

(30) Foreign Application Priority Data
Feb. 20, 2003  (IT) ................. MI2003A0302

(51) Int. Cl.
*B65D 81/32* (2006.01)

(52) U.S. Cl. ............... 426/112; 426/77; 426/107; 426/109; 426/115; 426/433; 99/293; 99/295; 99/303

(58) Field of Classification Search ............ 426/433, 426/77, 107, 109, 112, 115; 99/433, 295, 99/293, 303
See application file for complete search history.

(56) References Cited

U.S. PATENT DOCUMENTS

| 4,167,899 A | * | 9/1979 | McCormick ............ 99/302 R |
| 6,026,733 A | | 2/2000 | Orrico et al. |
| 6,229,128 B1 | * | 5/2001 | Policappelli ............ 219/689 |
| 2001/0042446 A1 | | 11/2001 | Denny |

FOREIGN PATENT DOCUMENTS

| EP | 0 112 086 | 6/1984 |
| WO | WO 02/28242 | 4/2002 |

* cited by examiner

*Primary Examiner*—Keith D Hendricks
*Assistant Examiner*—Chaim Smith
(74) *Attorney, Agent, or Firm*—Young & Thompson

(57) ABSTRACT

The beverage can presents immediately below the lid a first chamber not initially containing beverages ready for use, but intended to receive the final beverage, the first chamber being separated by a sealed baffle from a second chamber which already contains, a drinkable liquid; the sealed baffle presenting a housing constructed to receive a filtering device provided with a tube intended to dip into the interior of the second chamber. Elements are provided to enable the consumer to dispose the filtering device in the utilization condition in which communication is established between the two chambers via the filtering device such that, when the can is subjected to the action of a heat source, the liquid contained in the lower chamber is transferred into the first chamber (38) by passing through the substance, to give rise to the formation of the beverage.

18 Claims, 2 Drawing Sheets

BEVERAGE PRESERVATION AND DISTRIBUTION CAN, ALSO USABLE FOR THE EXTEMPORANEOUS PREPARATION OF BEVERAGES BY EXTRACTION AND/OR INFUSION

BACKGROUND OF THE INVENTION

The present invention relates to a can for beverages, i.e. a container of a material suitable for food use within which the beverages are sealed for preservation and large scale distribution to the final consumer, which, besides performing said preservation and large scale distribution function for the foods contained therein, enables an extracted and/or infused beverage to be produced at the moment of use by the said can, the thus formed beverage collecting within a cavity in the interior of the can, to be consumed directly from it.

It has been statistically shown that coffee is one of the most consumed beverages in the world, a coffee beverage being that beverage formed when ground coffee transfers to hot water the soluble and aromatic substances contained therein, both by the effect of extraction when the water heated to a temperature close to its boiling point is passed through the ground coffee, and by infusion when a certain quantity of ground coffee is left for some minutes in water at a temperature close to its boiling point.

In public premises such as hotels, cafeterias, refreshment rooms (for example in offices and stations), this beverage is commonly produced by equipment of considerable size, known as "coffee machines" which require the presence of an operator.

In private houses this beverage is commonly prepared using equipment known as "coffee pots", composed of relative parts; when required, the consumer fills the appropriate parts with tap water and coffee powder, then assembles the parts, places the combination on a source of heat, awaits the formation of the coffee beverage and pours it into cups, finally separating the pieces of the combination and cleaning them to enable another beverage to be prepared. Numerous small coffee machine are also available for household use, these reproducing on a small scale the coffee machines of public premises.

For many years the need has been felt by the consumer to be able to obtain the beverage when required, even if he has no coffee pot or large or small coffee machine available; this happens mostly when the consumer is far from home, for example while travelling, when practising sports, or when far from inhabited centres.

DESCRIPTION OF THE RELATED ART

In attempting to satisfy this requirement, powders instantaneously soluble in water have been marketed, such as that known by the trademark NESCAFE®, however the beverage obtained thereby does not satisfy the palate of the consumer to the same extent as that produced by extraction or infusion. In any event, this makeshift solution does not solve the problem of overcoming the lack of water, a situation which can occur in particular when the consumer is far from inhabited centres (for example during excursions or in a boat), or even more so in countries in which water is not easily available or its drinking quality is uncertain.

In an attempt to overcome this drawback, cans containing an already prepared coffee beverage have been marketed for same years, the final consumer heating them when required. However it is well known that the coffee taste alters considerably as a result of subsequent heating after the cooling which the beverage has undergone on preparation, this being shown by the poor distribution which such cans have encountered commercially.

An object of the present invention is therefore to satisfy the aforesaid requirements while at the same time obviating the aforedescribed drawbacks.

Another object of the present invention, of primary importance (and of evident usefulness) even if expressed subsequent to the first stated object, is to achieve a mass distribution (similar to that currently achieved for COCA COLA®) which enables any person wherever located, provided a heat source is available, to enjoy the invigorating and refreshing properties of a true coffee beverage produced at that moment, while at the same time preserving those elements necessary for preparing the beverage until the moment of their use.

A further object is to provide a can which, besides enabling a true coffee beverage to be produced at the moment of need, can be arranged to also produce other beverages obtainable from various substances by extraction and/or infiltration.

SUMMARY OF THE INVENTION

The aforespecified objects are attained according to the present invention by a beverage can, i.e. a container of the type commonly used for the preservation and large scale distribution of foods and intended to be disposed of after use, said can comprising a side wall, a base and a lid, and allowing access to the foods contained in the can by removing or perforating the lid, characterised in that:
  immediately below the lid there is a first chamber not initially containing beverages ready for use, but intended to receive the final beverage, said first chamber being separated by a sealed baffle from a second chamber which already contains, when the can is supplied to the user, a suitable quantity of drinkable liquid;
  said sealed baffle presenting a housing constructed to sealedly receive the non-permeable portion of a filtering device consisting of an envelope enclosing a suitable quantity of a substance able to produce a beverage by extraction and/or infusion and provided with a tube intended to dip into the second chamber containing the liquid;
  means being provided to enable the user to dispose the filtering device in the utilization condition in which communication is established between the two chambers via the filtering device such that, when the can is subjected to the action of a heat source by the user, the liquid contained in the second chamber, on attaining a temperature close to boiling point, is transferred into the first chamber by passing through the substance contained in the filtering device, to give rise to the formation of the beverage.

The filtering device is preferably already contained in the first chamber, even if not located in its position of utilization, it then being brought into the utilization position by the user.

Different types of beverages formable by extraction or infusion can be obtained in the same manner using various substances such as ground coffee and barley, tea, cocoa; said substances can be ground to a more or less fine degree which can vary from very fine powders to pieces of chopped leaves and can be mixed with other foods, for example powdered milk, sugar; hereinafter the term "beverage" will always be used for the final liquid product and "substance" for that contained in the filtering device and able to give rise to the beverage. In the same manner the drinkable liquid will most commonly be water, but can be replaced by or enriched with other liquids such as milk, to give rise to the formation of beverages other than coffee, such as cappuccino; the final liquid product will in all cases be known as the "beverage".

According to one embodiment of the present invention, the first chamber, intended to receive the final beverage, forms one piece with the hollow chamber containing the liquid.

According to a variant of the invention, the first chamber for collecting the beverage and the second chamber containing the liquid form one piece with each other and with a sealed baffle which separates them.

According to another variant of the invention, the first collection chamber is bounded by a container of roughly cup shape with its mouth facing upwards and having a shape and dimensions such as to be able to be inserted within the side wall of the can to form, between said container and said side wall, an interspace within which when the can is supplied to the user there is already interposed a determined quantity of liquid; the container and the side wall of the can having at least one perimetral region in contact and being sealedly joined together at least in this region. It should be noted that in the described example those walls of the cup-shaped container adjacent to the interspace act as a separation baffle, the interspace forming the second chamber.

According to one embodiment of the invention, the can is provided with a filtering device to be inserted into a housing disposed for this purpose on the separation baffle, said housing being initially closed by an impermeable membrane. Said filtering device can be sealedly inserted by the user into the housing such as to break the membrane and hence be in its working condition. The filtering device consists of an envelope which is closed or is closable in the manner of a capsule intended to retain the substance, one end of said envelope being provided with a tube intended to dip into the interior of the second chamber containing the liquid, the other end of said envelope presenting at least one filtering region, i.e. permeable only to liquids so that the liquid, having passed through the ground substance, can emerge into the first chamber acting as the collection chamber; at least one portion of the non-permeable region of the filtering device is shaped to insertingly mate with the housing disposed on said separation baffle, and vice versa.

If necessary, the stability and the seal of the filtering device at the perimeter of the housing in which said device has been inserted can be ensured by suitable gaskets.

Conveniently, when the can is supplied to the user, the filtering device is already contained in the first collection chamber so that the user, having removed or perforated the lid, has access to said filtering device and can operate on it to move it into its final working position. Alternatively, the filtering device could be not already located in the can, but instead accompany it, for example in a package containing a can with a filtering device next to it.

Conveniently the filtering device already contains a determined quantity of substance when the can is supplied to the user. Alternatively, said quantity of substance could be not contained in the filtering device but instead could accompany it (for example suitably packaged within the collection chamber), in which case the filtering device must be openable to enable the user to insert said substance into it. In particular the substance can be packaged within a permeable envelope (for example a sachet of filter paper) insertable into the filtering device.

According to one embodiment of the invention, the means for putting the substance contained in the filtering device into communication at the moment of use with the interior of the mass of liquid contained in the second chamber comprise:
  a tube forming part of the filtering device, one end of the tube being free;
  a region of the sealed separation baffle pierceable by the free end of the tube by the intervention of the user;
  and means for providing the outward seal between the second chamber already containing the liquid and the tube when the can is in its utilization condition.

According to a further variant of the invention, the means for putting the substance contained in the filtering device into communication at the moment of use with the interior of the mass of liquid contained in the second chamber comprise:
  a housing disposed on the sealed separation baffle and consisting of a circumscribed region which can be opened by the user by lifting a tab or by piercing, such as to create a through hole between the second chamber already containing the liquid and the first chamber intended to contain the final beverage, within which hole the filtering device can be received;
  and means for providing the outward seal between the second chamber already containing the liquid and that portion of the filtering device which has been placed in the hole by the user.

BRIEF DESCRIPTION OF THE DRAWINGS

The invention will be more easily understood from the ensuing description of two embodiments thereof given by way of example. In this description, reference is made to the accompanying drawings, in which.

DETAILED DESCRIPTION OF THE PREFERRED EMBODIMENTS

Figure 1:
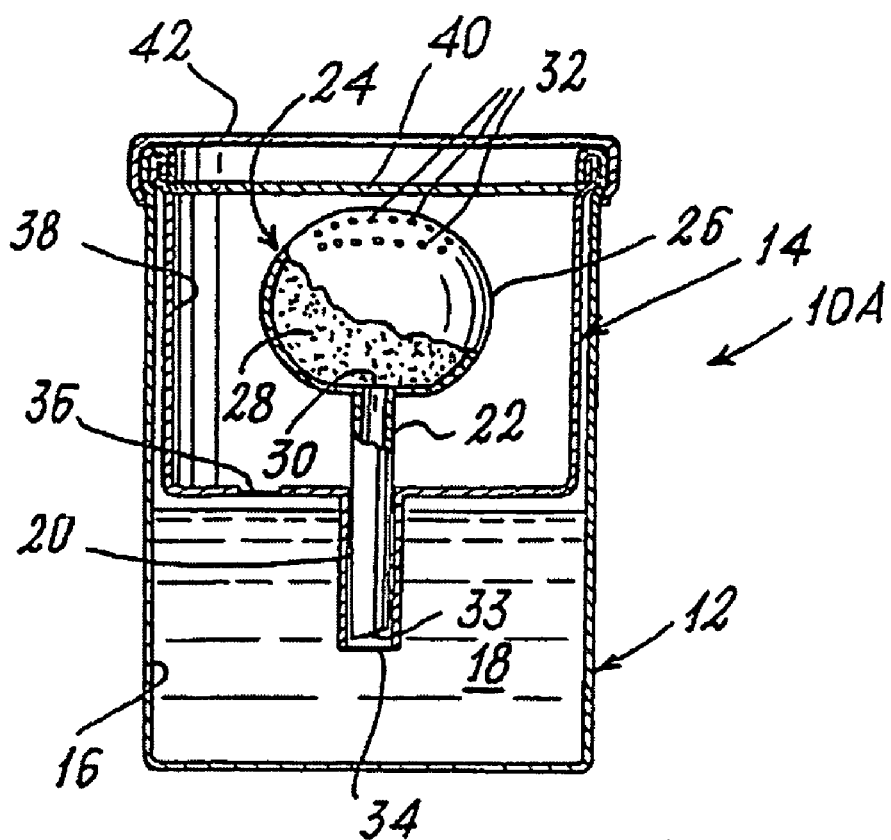
FIG. 1 is a vertical axial section through a first embodiment of the can of the invention, this can being in the condition in which it is supplied to the user.
Figure 2:
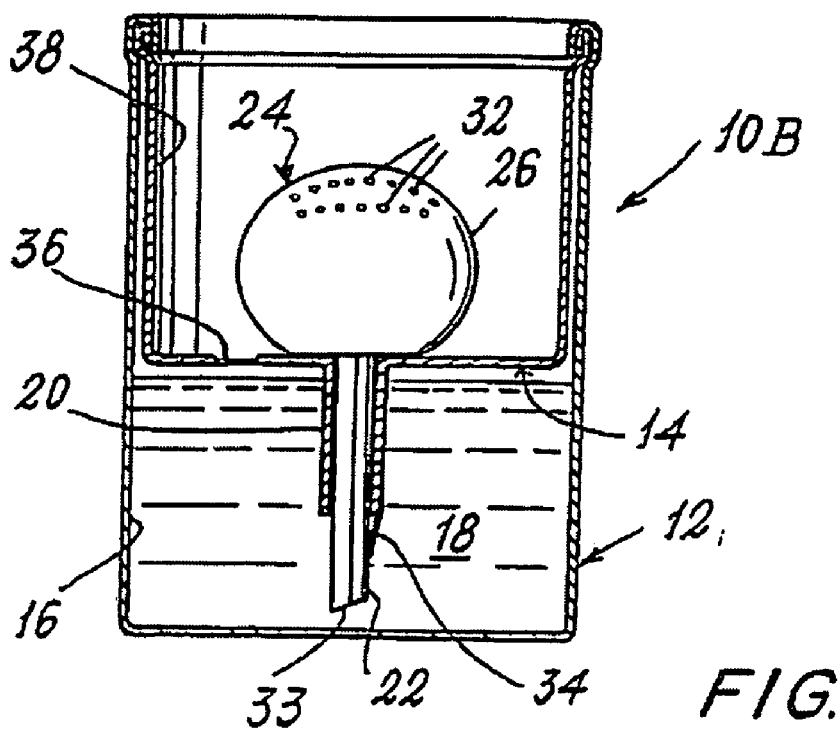
FIG. 2 is a section similar to that of FIG. 1, but with the can in its utilization condition achieved by the intervention of the user.

As can be seen in FIGS. 1 and 2, the can 10—indicated specifically by 10A in the condition of FIG. 1 and by 10B in the condition of FIG. 2—comprises an outer container 12 of cup shape and an inner container 14 also roughly of cup shape, the inner container 14 being inserted concentrically into the outer container 12. In the illustrated example, the two cups 12 and 14 are of a suitable material (for example aluminium or plastic) to enable the relative upper edges to be turned over and clinched or welded together in conventional manner (as shown schematically in said figures), to obtain a seal between the two. Consequently a sealed intermediate chamber 16 is obtained, already containing a quantity of liquid (for example water). The inner container 14, the walls of which also act in this case as the separation baffle, laterally and lowerly bounds an upperly open chamber 38 to act as the chamber for receiving the beverage produced in the can 10. As can be seen in FIG. 1, an upperly open coaxial duct 20 extends downwards from the base of the inner container 14 and is closed lowerly by a sealing membrane (for example a sheet of aluminium of the type which closes the mouth of certain toothpaste tubes). As can be seen from FIG. 1, a tube 22 of a suitable material, for example plastic, and forming part of a filtering device indicated overall by 24, is partially inserted by slight forcing into the duct 20. The tube 22 has an outer diameter such that to insert the tube 22 into the duct 20 a force has to be exerted which besides serving to retain the tube 22 in the duct 20 (the condition shown in FIG. 1), also provides the required seal between the tube 22 and the duct 20. Consequently, by forcing the tube 22 of FIG. 1 downwards into the duct 20, the user obtains the situation shown in FIG. 2 in which the lower end (preferably shaped as a flute mouthpiece, as in said figures) of the tube 22 has pierced the sealing membrane 34 which closes the lower end of the duct 20. In addition to the tube 22, the filtering device 24 also comprises a hollow part shaped as a capsule 26 (substantially spherical in the specific example) already containing a determined quantity of substance 28 (for example ground coffee). The substance 28, which can also be in the form of granules or powder, cannot descend into the tube 22 because at its upper mouth, communicating with the interior of the spherical wall 26, there is provided a liquid-permeable baffle, indicated in FIG. 1 by 30 (for example formed from filter paper or a suitable mesh). As can be seen in FIG. 1, the spherical part 26 of the filtering device 24 presents a series of perforations 32 in its upper part so that the capsule is provided with a permeable region through which the final beverage can emerge.

When the can 10 is supplied to the user (i.e. when he purchases it), the filtering device 24 is in the condition 10A of FIG. 1, as stated.

It should be noted that the can 10 could remain in the condition 10A of FIG. 1 even during use if the sealing baffle 34 is formed of a substance able to dissolve following heating. In that case the intervention of the user is limited to the operation of subjecting the can 10A to the action of a source of heat. The same would apply if the sealing baffle consisted of a membrane pierceable by the effect of the pressure increase created within the second chamber 16 containing the liquid 18 when the can is subjected to the action of a heat source; this membrane would evidently have a resistance to pressure less than that of the wall of the chamber 38 and of the separation baffle 14, and also less than that of the release pressure of a safety valve 36 with which the can is provided (and which will be described hereinafter). Again in this case the intervention of the user is limited to the operation of subjecting the can 10A to the action of a heat source.

The can 10A is conveniently provided with a removable lid 40; the edge of this lid can be turned over and joined by clinching or welding to the edges of the two containers 12 and 14, the lid being for example provided with a known ring (not shown) for tearing off the lid. Alternatively, the can could be provided with a common cover (for example of plastic) 42 applicable by pressure to the upper edge of the can 10. The can could also be provided with a further cover positioned (for example for hygienic reasons) above one of those already described.

As will be apparent from the aforegoing description, the can is of extreme simplicity and very low cost (especially if constructed of aluminium and/or plastic). This is important given that, as will be immediately apparent, the can cannot be reused in practice, so that it is of disposable type, to be thrown away after use.

It should be noted that the term "can" is commonly used to define food containers constructed of materials other than the tinplate formally used for the originally named "tin cans", provided that they are suitable for food preservation, for example aluminium or plastic, hence in the present invention the can construction material is to be understood in the widest sense. For the same reason the term "can" also indicates containers of not exclusively cylindrical shape (for example parallelepiped).

Although apparent from the aforegoing description, a short description will now be given of the use of the can 10 for greater clarity.

As stated, the user purchases the can 10 in the condition 10A of FIG. 1.

When he decides to use it to obtain the relative beverage, the user after removing any cover has merely to force the filtering device 24 inwards with the fingers so that the tube 22, which has not yet been completely inserted into the duct 20, enters it as far as possible. The result is that the flute mouthed tip of the tube 22 pierces the sealing baffle 34, until it arrives in proximity to the base of the outer container 12 (the can being now in the condition 10B of FIG. 2) so that the tube 22 dips into the mass of liquid (for example water) contained in the second chamber 16. The filtering device 24 is advantageously constructed of a plastic material suitable for contact with foods but sufficiently rigid to enable the tube 22 to be forced into the duct 20, the forcing also ensuring the necessary seal between the tube 22 and the inner wall of the duct 20.

With the can in the condition 10B it need only be subjected to the action of a heat source (for example by placing it on a flame or in a microwave oven), until the liquid 18 contained in the chamber 16 boils, so that this liquid rises along the tube 22, passes through the mass of substance 28 contained in the capsule 26, to leave in the form of a beverage from the perforations 32, and be finally collected in the inner container 14 which, as stated, acts as a collection chamber for the beverage; at this point the user can also drink the beverage directly from the can, as happens with other beverages (for example beer) commonly distributed in cans. When the beverage has been drunk or used, the can is disposed of.

Figure 5:
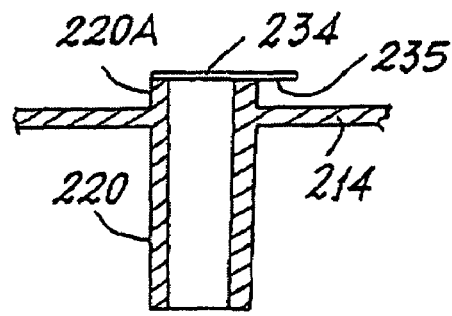
FIG. 5 shows a detail of another variant of the can of FIGS. 1 and 2.

It should also be noted that the can 10 can also be sold without the filtering device being located in the position of FIG. 1, it simply lying in the inner container 14 if sufficiently large. In that case a closure, for example a cover of the aforedescribed types, prevents the accidental escape of the filtering device from the can upper aperture while at the same time preserving its aroma. As an alternative to the aforedescribed covers, but for the same covering purpose, the can could be wrapped in a packaging wrapping, for example in a sheet of heat shrinkable plastic). It should be noted that the filtering device can also be disposed on the outside of any cover. If the filtering device 24 is not already disposed in the position of FIG. 1, breakage of the separation baffle 34 can take place in a pierceable region 34, which can be pierced by other means instead of the lower end 33 of the tube 22, and in particular by a plastic stick or pin with which the can may be provided. Another variant is that shown in FIG. 5, in which the duct 220 extends slightly above (portion 220A) a separation baffle 214, on the upper mouth of the portion 220A there being applied a sealing membrane 234 which can be torn off by the user on utilization, this operation being facilitated by a gripping tab 235.

Figure 3:
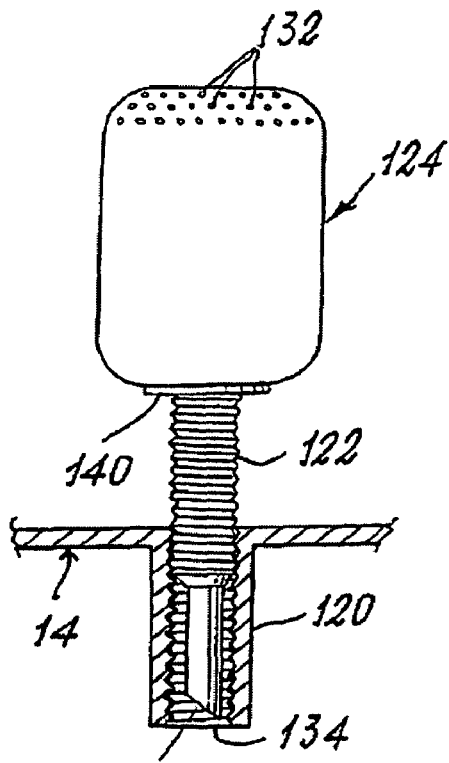
FIG. 3 is a partial section through a variant of the can of FIGS. 1 and 2, in the condition corresponding to that of FIG. 1.
Figure 6:
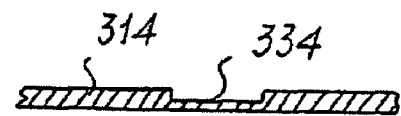
FIG. 6 shows a detail of another variant.

According to a particularly simple variant (FIG. 6) of the invention, the housing for the tube 22 and the pierceable region of the separation baffle are obtained simply by centrally providing in the separation baffle 314 a thin circular area 334 which is easily pierced by the tube 22 or by other means. According to a further variant of the can of the invention (shown partially in FIGS. 3 and 4, but for the rest similar to that of FIGS. 1 and 2), the larger diameter upper part of the tube 122 is externally threaded, this thread being arranged to engage a female thread provided in the inner wall of the duct 120. In FIG. 3 the filtering device 124 (which in this case is of ovoidal shape) is in the condition (that in which the can is supplied to the user) in which only a part of the threaded portion of the tube 122 is screwed (preferably slightly forced) into the duct 120.

Figure 4:
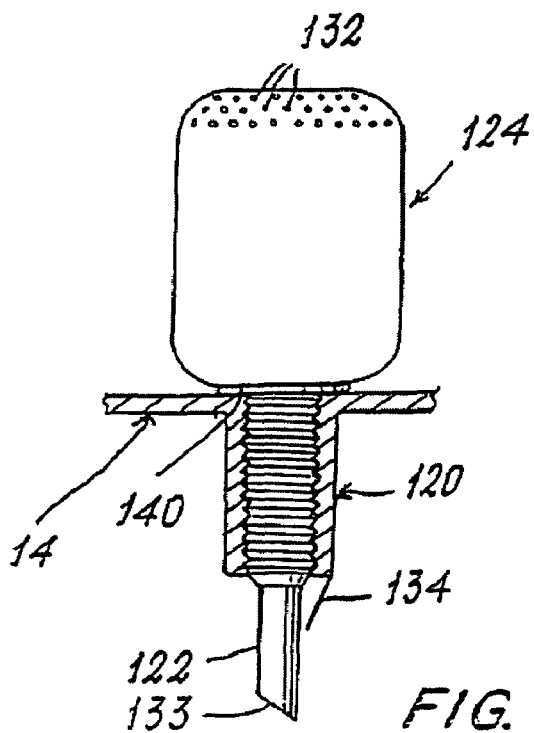
FIG. 4 shows the same variant as FIG. 3, but in the condition corresponding to FIG. 2.

When the user wishes to use this can, he merely screws the tube 122 completely into the duct 120, with the result that the lower flute mouthpiece-shaped end 133 of the tube 122 pierces the sealing membrane 134, to achieve the condition shown in FIG. 4, in which the lower end 133 of the tube 122 dips into the liquid contained in the second chamber (not shown). This embodiment is appropriate both if the filtering device is formed of a suitable plastic material, so that by appropriately choosing the dimensions and material of the tube 122 the seal can also be obtained between the tube 122 and the duct 120, and if a suitable metal (such as aluminium) is used or a plastic material which does not enable said seal to be obtained. However in this latter case a seal gasket such as that indicated by 140 in FIGS. 3 and 4 must be used to provide the seal.

It should be noted that if in addition to the filtering device 24 or 124 the two containers 12 and 14 are also constructed of an appropriate plastic suitable for contact with food, the can will not be suitable for placing on a flame or an electric hotplate, but can be used by insertion into a microwave oven.

Finally it should be noted that the can of the invention, and particularly the second chamber already containing the liquid, can be conveniently provided with a safety valve. This latter can be conveniently positioned to vent into the first chamber acting as the collection chamber. In this manner external projections are avoided so that the can does not differ externally in its shape and appearance from a normal commercially available food can and can be treated and handled as such.

With regard to the substance to be used in the can of the invention to obtain the relative beverage, in addition to chopped or powdered substances, substances of gelatinous form (including in capsules) can be used, provided they are suitable for producing the required beverage when located in the filtering device.

The invention claimed is:

1. A beverage can used for the preservation and large scale distribution of foods and intended to be disposed of after use, comprising:
   a side wall (12) surrounding a first chamber (38) and a second chamber (16);
   a base connected to a first portion of the side wall (12); and
   a lid (40) connected to a second portion of the side wall (12) configured to be removed or perforated to provide access to the foods contained in the beverage can,
   wherein said first chamber (38) is immediately below the lid (40) and configured to receive a beverage, said first chamber being separated from the second chamber (16) by a sealed baffle (14, 214, 314), said second chamber (16) configured to initially contain, when the beverage can is supplied to the user, a suitable quantity of drinkable liquid (18),
   wherein said sealed baffle presents a housing (20, 120, 220, 334) constructed to sealedly receive the non-permeable portion of a filtering device (24, 124), the filtering device comprised of an envelope configured to enclose a suitable quantity of a substance (28) configured to produce the beverage by extraction and/or infusion, and a tube (22, 122) configured to dip into an interior of the second chamber (16) containing the liquid (18),
   wherein the filtering device (24, 124), in a utilization condition, is configured to establish a communication between the two chambers (38 and 16) through said filtering device (24, 124) such that, upon the beverage can being subjected to an action of a heat source, the liquid contained in the lower chamber (16) is transferred into the first chamber (38) by passing through said substance (28) and giving rise to formation of the beverage,
   wherein the first chamber (38) is bounded by a container (14), said container (14) having an aperture facing upwards, and said container (14) being dimensioned and positioned within the side wall (12) of the beverage can (10) and within the second chamber (16) such that an interspace is formed between said container (14) and said side wall (12), the interspace constituting a portion of the second chamber (16) adjacent to the first chamber (38), and
   wherein said side wall (12) and said container (14) have at least one perimetral region in contact and being sealedly joined together at least in this perimetral region.

2. The beverage can (10) as as claimed in claim 1, wherein the lid (40) is independent of the beverage can structure.

3. The beverage can (10) as as claimed in claim 1, wherein at least one other removable cover (42) is positioned above the lid (40).

4. The beverage can (10) as as claimed in claim 1, being at least partly constructed of plastic material.

5. The beverage can (10) as claimed in claim 1, said beverage can being configured for use in a microwave oven.

6. The beverage can (10) as claimed in claim 1, wherein, when the beverage can is supplied to the user, the filtering device (22, 124) is contained in the first chamber (38).

7. The beverage can (10) as claimed in claim 1, wherein the housing configured to sealedly receive the nonpermeable portion of the filtering device comprises a pierceable region of the sealed baffle.

8. The beverage can (10) as claimed in claim 1,
   wherein the housing for sealedly receiving the non permeable portion of the filtering device (24, 124) comprises a through duct (20, 120, 220) forming a part of the sealed baffle (14, 114, 214), and
   wherein communication via said duct between the liquid (18) and the substance (28) contained in the filtering device (24, 124) is prevented, when the beverage can is supplied to the user, by one of a pierceable membrane (34, 134) and a removable membrane (234).

9. The beverage can (10) as claimed in claim 8, wherein at least a part of the through duct (20, 120, 220) is threaded to engage a threaded portion of the filtering device (24, 124).

10. The beverage can (10) as claimed in claim 1, wherein a gasket (140) provides a seal between the nonpermeable portion of the filtering device (24, 124) and the housing (20, 120, 220, 334).

11. The beverage can (10) as claimed in claim 1, wherein, when supplied to the consumer, the filtering device (24, 124) contains a suitable quantity of the substance (28).

12. The beverage can (10) as claimed in claim 1, wherein the substance (28) is ground coffee.

13. The beverage can (10) as claimed in claim 1, wherein the substance (28) is a soluble solid.

14. The beverage can (10) as as claimed in claim 1, wherein the chamber (16) is provided with a safety valve.

15. The beverage can (10) as claimed in claim 14, wherein the safety valve (36) vents into an interior of the first chamber (38).

16. The beverage can (10) as claimed in claim 1, wherein communication between the second chamber (16) and the substance (28) is prevented, when the beverage can (10) is supplied to the user, by an edible heat soluble membrane.

17. The beverage can (10) as claimed in claim 1, wherein communication between the chamber (16) containing the liquid (18) and the substance (28) contained in the filtering device (24, 124) is prevented, when the beverage can (10) is supplied to the user, by a membrane pierceable by a pressure increase created within the second chamber (16) when the beverage can is brought into contact with a heat source.

18. A beverage can used for the preservation and large scale distribution of foods and intended to be disposed of after use, comprising:
- a side wall (12) surrounding a first chamber (38) and a second chamber (16);
- a base connected to a first portion of the side wall (12); and
- a lid (40) connected to a second portion of the side wall (12) configured to be removed or perforated to provide access to the foods contained in the beverage can,
- wherein said first chamber (38) is immediately below the lid (40), said first chamber (38) and configured to receive a beverage, said first chamber being separated from the second chamber (16) by a sealed baffle (14, 214, 314), said second chamber (16) configured to initially contain, when the beverage can is supplied to the user, a suitable quantity of drinkable liquid (18),
- wherein said sealed baffle presents a housing (20, 120, 220, 334) constructed to sealedly receive the nonpermeable portion of a filtering device (24, 124), the filtering device comprised of an envelope configured to enclose a suitable quantity of a substance (28) configured to produce the beverage by extraction and/or infusion, and a tube (22, 122) configured to dip into an interior of the second chamber (16) containing the liquid (18),
- wherein the filtering device (24, 124), in a utilization mode, is configured to establish a communication between the two chambers (38 and 16) through said filtering device (24, 124) such that, upon the beverage can being subjected to an action of a heat source, the liquid contained in the lower chamber (16) is transferred into the first chamber (38) by passing through said substance (28) and giving rise to formation of the beverage,
- wherein the housing for sealedly receiving the non permeable portion of the filtering device (24, 124) comprises a through duct (20, 120, 220) forming a part of the sealed baffle (14, 114, 214),
- wherein communication via said duct between the liquid (18) and the substance (28) contained in the filtering device (24, 124) is prevented, when the beverage can is supplied to the user, by one of a pierceable membrane (34, 134) and a removable membrane (234), and
- wherein at least a part of the through duct (20, 120, 220) is threaded to engage a threaded portion of the filtering device (24, 124).

* * * * *